United States Patent [19]

Collonia

[11] Patent Number: 4,495,454
[45] Date of Patent: Jan. 22, 1985

[54] DEVICE FOR ELECTRIC CONTROL OF THE SPEED OF AN AUTOMOTIVE VEHICLE

[75] Inventor: Harald Collonia, Glashütten, Fed. Rep. of Germany

[73] Assignee: VDO Adolf Schindling AG, Frankfurt am Main, Fed. Rep. of Germany

[21] Appl. No.: 397,251

[22] Filed: Jul. 12, 1982

[30] Foreign Application Priority Data

Jul. 30, 1981 [DE] Fed. Rep. of Germany ....... 3130099

[51] Int. Cl.³ .............................................. G05B 1/06
[52] U.S. Cl. .................................... 318/663; 318/603; 364/426; 364/431.05; 123/352
[58] Field of Search ........................ 318/663, 603, 609; 364/426, 431.05, 431.07, 341.12; 123/352

[56] References Cited

U.S. PATENT DOCUMENTS

| 3,548,865 | 12/1970 | Povinger | 318/609 X |
| 3,644,815 | 2/1972 | Falk | 318/603 |
| 4,117,903 | 10/1978 | Fleischer | 123/352 X |
| 4,133,406 | 1/1979 | Allerdist | 364/426 X |
| 4,158,350 | 6/1979 | Muller et al. | 318/609 X |
| 4,313,408 | 2/1982 | Collonia | 123/352 X |
| 4,354,467 | 10/1982 | Noddings et al. | 123/352 |

Primary Examiner—B. Dobeck
Attorney, Agent, or Firm—Martin A. Farber

[57] ABSTRACT

A device for the electric control of the speed of an automotive vehicle having a guide signal transmitter developed as settable memory, having a comparison element fed with the guide signal and a vehicle-speed signal, having a control amplifier which is arranged behind the comparison element and gives off a set signal to a setting drive for the displacement of a throttle valve which controls the air-fuel mixture of an internal combustion engine, having a position indicator coupled with the throttle valve apparatus and having a guide signal transmitter developed as settable memory. A comparator for comparing the set signal with a feedback signal given off by the position indicator is provided, the output value of which sets the guide signal transmitter at such a large guide signal that the position of the throttle valve at an end of the setting process, which has been determined during the setting by a driver, is established by the set signal.

3 Claims, 1 Drawing Figure

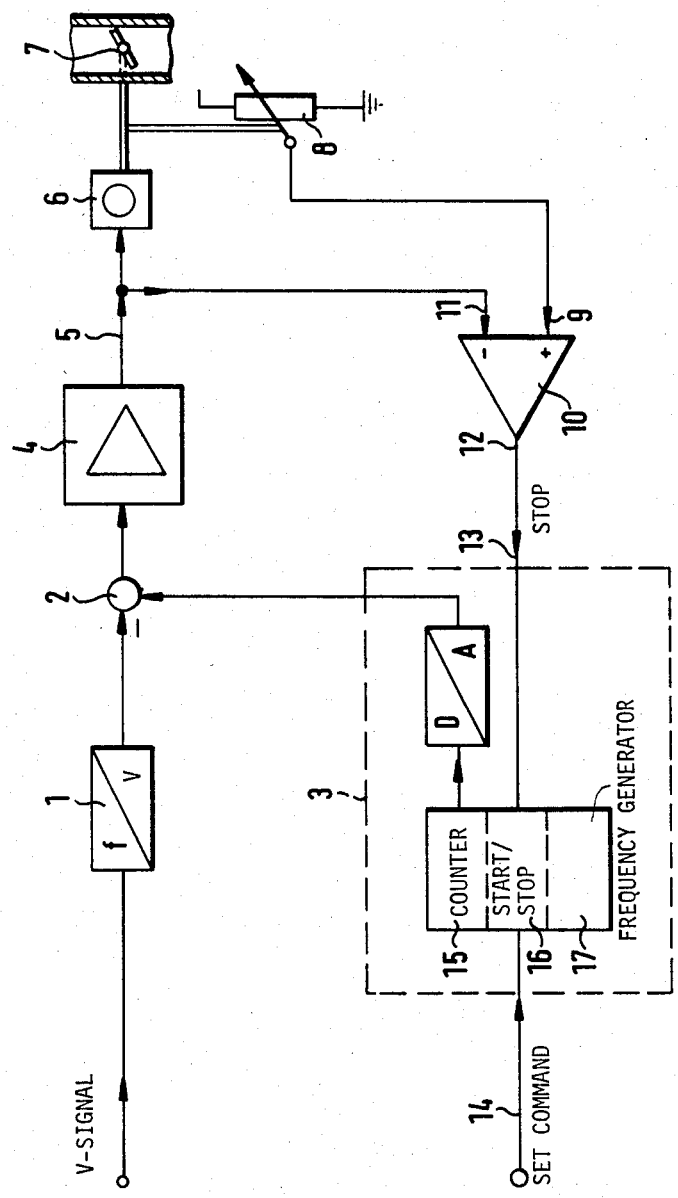

DEVICE FOR ELECTRIC CONTROL OF THE SPEED OF AN AUTOMOTIVE VEHICLE

The present invention relates to a device for the electric control of the speed of an automotive vehicle having a guide signal transmitter developed as settable memory, having a comparison point fed with the guide signal and a car-speed signal, having a control amplifier which is arranged behind the comparison point and gives off a setting signal to a setting drive for the displacement of a throttle valve or similar member which controls the fuel-air mix of an internal combustion engine, having a position indicator coupled with the throttle valve and having a guide signal transmitter developed as settable memory.

In such known devices the guide parameter which represents the desired value for the desired speed of the vehicle is formed in the manner that the actual car speed signal is stored in a resettable memory by a set command at the moment that the actual speed has the desired value. For this purpose a counter in the memory is generally fed by a frequency generator until the reading of the counter corresponds to the actual speed of the car. The voltage which is then given off by the settable memory via a digital-analog converter is the guide signal for the further course of the regulation. The guide signal is then compared at the comparison point with the actual car-speed signal and fed into the control amplifier. The set signal formed by the control amplifier displaces a setting drive and a throttle valve driven by the latter in such a manner that the car speed stipulated by the guide signal is reached or maintained even under the action of disturbing variables. Generally, in such known devices a position indicator in the form of a potentiometer is coupled to the throttle valve and its signal is coupled to a second comparison point at the input of the control amplifier. In this way inaccuracy in the setting of the throttle valve for a given set signal, which otherwise might be caused by the influence of friction and resetting forces, is avoided.

These known devices for the electric control of speed have the disadvantage that, after the setting process has been concluded, and when the desired value of the speed to be obtained has been stored in the memory in the manner described and the driver no longer actuates the throttle valve himself, the position of the throttle valve which corresponds to the desired speed of the car must be set by means of the control difference which determines the set signal and is formed from the car speed signal and the guide value or desired value. Due to the basically continuous control difference in the case of proportional controllers and controlled systems with proportional behavior, the car speed reached then differs from the guide value set by an amount which although small can be disturbing in particular when traveling in a convoy or with speed limitations which must be precisely maintained. This continuous difference could be reduced by higher control amplification, which, however, can lead to a lack of stability, or by regulators having a special time behavior, which, however, are more difficult to optimize.

The object of the present invention, therefore, is so to develop the device for electric control of the speed of cars that the speed of the car at the moment that the memory is set is accurately retained even when the throttle position is no longer determined by the driver by actuation of the gas pedal, i.e. the automatic control is activated.

This object is achieved in accordance with the invention by the provision of means (comparator 10) for comparing the set signal with the feedback signal given off by the position indicator (8), the output value of which means set the guide-signal transmitter (memory 3) at such a large guide signal that the position of the throttle valve at the end of the setting process which has been determined during the setting by the driver is established by the set signal.

The invention provides the important advantage that the device sets the throttle valve directly—i.e. not via a control difference formed from the speed of the car and the guide valve—into the position which it had before the transfer to automatic control. In other words, the device for all practical purposes takes note of the position of the throttle valve at the desired speed which has been established by the position of the gas pedal. The device produces a guide value which is not derived from the actual speed of the car during the setting process but, rather, forms this guide value from the setting signal and the position of the throttle valve. This guide value which for all practical purposes only indirectly represents the desired speed of the car is used in the automatic control process for comparison with the actual car speed signal so that changes in speed caused by disturbances are counteracted here also.

This device requires only a slight additional expense, made necessary in particular as a result of the means for comparing the set signal with the feedback signal given off by the position indicator. Furthermore, conventional devices can be used as settable storage and for the position indicator coupled with the throttle valve. There is also the possibility of feeding the signal of the position indicator also, as known, back to another comparison point at the input of the controller in order to avoid inaccuracies in the adjustment of the throttle valve as a result of friction or changes in restoring forces. The device of the invention can therefore dispense with controllers with high closed-loop gain or special time behavior for maintaining or establishing the desired throttle valve position.

Furthermore, in accordance with the invention, as means of comparison there is provided a comparator (10) which has a first input (11) connected to the output (5) of the control amplifier (4) while its second input (9) is connected with the position indicator (8), and the output (12) of the comparator is connected to a stop input (13) of the settable memory (3), by which input an integration or counting process which forms the guide value can be stopped in the settable memory.

Furthermore, in accordance with the invention, the settable memory (3) comprises a counter (15) which is fed by a frequency generator (17) and has a start-stop device (16) which is connected on the one hand with the stop input (13) and on the other hand with a set input (14) which can be acted on by a set command, and the guide signal can be derived from the counter via a digital-analog converter (18).

With the above and other objects and advantages in view, the present invention will become more clearly understood in connection with a detailed description of a preferred embodiment, when considered with the accompanying drawing showing a signal flow diagraph of the invention.

A voltage-frequency converter 1 converts a car speed signal given off as frequency by a transmitter (not shown) into a voltage. This car speed signal is fed into a comparison element 2 which is connected on the other side with a settable memory 3 for the guide value. The output of the comparison element feeds a control amplifier with P-portion 4 whose output 5 feeds a set signal to a setting drive 6. The setting drive serves for the adjustment of a throttle valve 7. A potentiometer is coupled as position indicator 8 with the throttle valve 7.

A feedback signal given off by the position indicator 8 is fed into an input 9 of a comparator 10 whose second input 11 is connected with the output 5 of the control amplifier. The output 12 of the comparator is connected to a stop input 13 of the settable memory 3 whose set input is designated 14.

Within the settable memory there is a counter 15 which is fed by a frequency generator 17 via a start-stop device 16. The counter output is connected to a digital-analog converter 18, which gives off the guide signal as an analog signal.

When, with the device described, the driver shifts from manual control of the speed of the car to automatic control, the driver introduces a set command into the set input 14 of the memory 3. As a result, the counter, fed by the frequency generator, commences to increment itself, starting from zero. The counting is stopped when a corresponding stop signal is fed into the stop input 13 by the comparator 10. This stop signal is formed when the set signal at the input 11 of the comparator, which is given off by the control amplifier 4 at the output 5, is equal to the feedback signal of the position indicator 8 at the input 9. This means that a set signal 5 is integrated, until the set signal corresponds to the position of the position indicator 8 which was present when, upon the setting, the throttle valve was still held by the driver in the position required for the desired speed. There thus results a continuous transition of the speed from driver-controlled to automatically controlled operation. Upon automatic control, the guide valve which has been derived from the feedback signal at the time of the setting of the memory is compared with the speed signal from the voltage frequency converter 1, and changes in speed which are caused by slope, load or other disturbing variables are compensated for by the control amplifier 4. It is noted that a control amplifier with a P-portion has at least a partly proportional control action.

I claim:

1. In a device for the electric control of the speed of an automotive vehicle driven by an internal combustion engine, the vehicle having a guide signal transmitter, a comparison element fed with a guide signal of the transmitter and a vehicle-speed signal, and a control amplifier which is arranged behind the comparison element and gives off a set signal to a setting drive for the displacement of a throttle valve which controls the air-fuel mixture of the internal combustion engine, the improvement comprising:

a position indicator coupled with the throttle valve for generating a feedback signal representing a position of the throttle valve, wherein the guide signal transmitter incorporates an integrator and a memory, and means for comparing the set signal with the feedback signal, an output signal of the comparing means being coupled to the guide signal transmitter to provide for integration of the set signal by the integrator, the integration beginning upon application of a set command signal to the integrator and upon a setting of the throttle valve in a desired position by a driver of the vehicle, the integration terminating when the comparing means signals equality between the magnitudes of the set signal and the feedback signal, thereby to maintain a vehicle speed in accordance with the present position of the throttle valve.

2. The device as set forth in claim 1, wherein said integrator includes a frequency generator, a start-stop device, and a digital-to-analog converter, said integrator further comprising a counter which is fed by said frequency generator via said start-stop device, said start-stop device being connected via a stop input thereof to said comparing means and having a set input which is acted on by the set command signal, and said guide signal being derived from the counter via said digital-to-analog converter, and wherein said counter serves on said memory upon a completion of the counting of pulses of said frequency generator.

3. In a device for the electric control of the speed of an automotive vehicle driven by an internal combustion engine, the vehicle having a guide signal transmitter, a comparison element fed with a guide signal of the transmitter and a vehicle-speed signal, and a control amplifier which is coupled to an output terminal of the comparison element and gives off a set signal to a setting drive for the displacement of a throttle valve which controls the air-fuel mixture of the internal combustion engine, the improvement comprising:

a position indicator coupled with the throttle valve for generating a feedback signal representing a position of the throttle valve, and means responsive to the difference between said set signal and said feedback signal for activating said transmitter to produce a guide signal corresponding to a position of said throttle valve, which throttle valve has been preset by a driver of the vehicle to maintain a predetermined vehicle speed, said guide signal transmitter comprises a memory for storing the value of the guide signal corresponding to the preset position of the throttle valve, said memory is formed as a counter, and wherein the transmitter further comprises means for incrementing a count of said counter during an interval of time initiated by a signal from the driver and terminating when equality is reached between the magnitudes of the set signal and the feedback signal.

* * * * *